United States Patent
LaFontaine

(10) Patent No.: US 8,196,135 B2
(45) Date of Patent: Jun. 5, 2012

(54) METHOD OF AND SOFTWARE FOR RECORDAL AND VALIDATION OF CHANGES TO MARKUP LANGUAGE FILES

(75) Inventor: Semer Geoffrey Thomas LaFontaine, Worcestershire (GB)

(73) Assignee: Deltaxml, Limited, Worcestershire (GB)

( * ) Notice: Subject to any disclaimer, the term of this patent is extended or adjusted under 35 U.S.C. 154(b) by 1989 days.

(21) Appl. No.: 10/333,655

(22) PCT Filed: Jul. 20, 2001

(86) PCT No.: PCT/GB01/03282
§ 371 (c)(1),
(2), (4) Date: Apr. 8, 2003

(87) PCT Pub. No.: WO02/08890
PCT Pub. Date: Jan. 31, 2002

(65) Prior Publication Data
US 2003/0167446 A1 Sep. 4, 2003

(30) Foreign Application Priority Data
Jul. 21, 2000 (GB) .................................. 0018042.2

(51) Int. Cl.
*G06F 9/445* (2006.01)
*G06F 9/44* (2006.01)

(52) U.S. Cl. ......... 717/174; 717/122; 717/168; 717/170
(58) Field of Classification Search .................. 717/170; 707/102, 200; 715/511
See application file for complete search history.

(56) References Cited

U.S. PATENT DOCUMENTS

| 5,956,726 A * | 9/1999 | Aoyama et al. ............... 707/102 |
| 6,018,747 A | 1/2000 | Burns et al. |
| 6,163,811 A * | 12/2000 | Porter ........................... 709/247 |
| 6,195,796 B1 * | 2/2001 | Porter ........................... 717/122 |
| 6,377,957 B1 * | 4/2002 | Jeyaraman .................... 707/200 |
| 6,502,112 B1 * | 12/2002 | Baisley ......................... 715/513 |
| 6,532,588 B1 * | 3/2003 | Porter ........................... 717/170 |
| 6,560,620 B1 * | 5/2003 | Ching ........................... 715/511 |

(Continued)

FOREIGN PATENT DOCUMENTS
EP 1016987 A 7/2000

OTHER PUBLICATIONS

Bergstraesser et al., Versions and workspaces in Microsoft repository, Jun. 1999, 2 pages, <http://delivery.acm.org/10.1145/310000/304248/p532-bergstraesser.pdf>.* Hunt et al., Delta algorithms: an empirical analysis, Apr. 1998, 23 pages, <http://delivery.acm.org/10.1145/280000/279321/p192-hunt.pdf>.*

(Continued)

*Primary Examiner* — Thuy Dao
(74) *Attorney, Agent, or Firm* — Carmody & Torrance LLP

(57) ABSTRACT

A method of recording changes to a markup language file which employs application-defined tags. The changes are recorded in a delta file which is also a markup language file providing validation of the recorded changes against substantially the same markup language structure as that of the markup language file being changed. Where the original markup language file is an XML file with a DTD, a DTD can be created for the delta file which substantially follows the DTD of the original markup language file. Strict compliance of the data recorded in the delta file with the delta DTD provides validation of the changes with respect to the original XML file.

12 Claims, 3 Drawing Sheets

U.S. PATENT DOCUMENTS

| | | | |
|---|---|---|---|
| 6,848,078 B1 * | 1/2005 | Birsan et al. | 715/511 |
| 6,931,590 B2 * | 8/2005 | Kanie et al. | 715/511 |
| 6,948,163 B2 * | 9/2005 | Melahn et al. | 717/168 |
| 7,035,866 B1 * | 4/2006 | Chen et al. | 707/102 |
| 7,150,015 B2 * | 12/2006 | Pace et al. | 717/176 |
| 7,574,706 B2 * | 8/2009 | Meulemans et al. | 717/174 |
| 2002/0083429 A1 * | 6/2002 | Rozenfeld et al. | 717/174 |
| 2003/0051236 A1 * | 3/2003 | Pace et al. | 717/177 |
| 2003/0159136 A1 * | 8/2003 | Huang et al. | 717/171 |
| 2004/0025155 A1 * | 2/2004 | Sedlack et al. | 717/174 |

OTHER PUBLICATIONS

B. Baker, Parameterized diff, Jan. 1999, 2 pages, <http://delivery.acm.org/10.1145/320000/314968/p854-baker.pdf>.*

Optimistic Deltas for WWW Latency Reduction, Proceedings of the Usenix Annual Technical Conference, Banga et al, 1997, pp. 289-303.

A Graphical Environment for Change Detection in Structured Documents, Computer Software and Applications Conference, Chang et al, 1997, pp. 536-541.

* cited by examiner

METHOD OF AND SOFTWARE FOR RECORDAL AND VALIDATION OF CHANGES TO MARKUP LANGUAGE FILES

CROSS-REFERENCE TO RELATED APPLICATIONS

This application is a National Stage application of International Application No. PCT/GB01/03282, filed Jul. 20, 2001.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK

Not Applicable

BACKGROUND OF THE INVENTION

1. Field of the Invention

The present invention relates to a method of managing changes to or between markup language files having application-defined markup tags and to software for performing the method such that the changes may be validated, tracked and recorded. More particularly the present invention is suited for use, but not exclusively, with Extensible Markup Language (XML) documents/files.

2. Description of Related Art

XML has been established as a standard for encoding information in electronic files for transfer between systems and across the world-wide-web (www). In particular, XML is used for the transfer of structured documents and data. Thus, XML is a set of rules, guidelines and conventions for designing text formats for data. Like HyperText Markup Language (HTML), XML is a markup language and so makes use of tags and attributes but while HTML specifies what each tag and attribute means XML uses the tags only to delimit pieces of data, and leaves the interpretation of the data completely to the application that uses it, hence the term application-defined tags. XML encodes, using these markup tags, a description of a document's storage layout and logical structure. Thus markup takes the form of start-tags, end-tags, empty-element tags, entity references, character references, comments, character data (CDATA) section delimiters, document type declarations and processing instructions. The markup tags are nested in a tree structure with the allowed structure for each tag, for example which tags may appear within a tag, formally defined in an element type declaration. Thus the structure of an XML file or document is specified by a set of element type declarations which is known as a Document Type Definition (DTD). The DTD is thus a grammar for the XML document. XML files may be large (tens of megabytes) and complex (over a thousand element type declarations within a DTD) especially where the XML file contains computer-aided design (CAD) data. Hence, a file recording changes to an XML file can also tend to be large and complex. "Extensible Markup Language (XML) I-O W3C Recommendation 10 Feb. 1998" provides a much more detailed explanation of XML and its contents is incorporated herein by reference.

It is often necessary, for example, in software testing and change control support, to determine the exact differences, if any, between two markup language files and to encode these in some way preferably in a separate document that will be referred to herein as a delta file. Delta files are known in other areas of software development, however, traditionally files have been treated as a sequence of data records, typically lines of text. Therefore, differences of order or even 'white space' for example spaces, new lines, carriage return/line feed are considered significant. This can be particularly problematic where more complex data structures such as CAD systems are involved. Ideally, though, a method that identifies and records these differences should ignore apparent differences, for example the ordering of XML element attributes, which do not constitute semantic differences (see for example Canonical XML Version 1.0: http://www.w3.org/TR/xml-c14n, <http/www/w3/org/TR/xml-c14n>, and the XML Information Set.

One approach to the analysis and recordal of differences between XML documents is the XML TreeDiff Update Language XML TreeDiff computes the differences between two XML documents by analysing the documents as DOM trees and identifying the differences as a sequence of tree editing operations (DOM is the acronym for Document Object Model). XML TreeDiff represents the differences between two XML files in a structure quite separate from that of the original XML files.

The present invention seeks to provide an improved method of and software for recording changes to markup language files that employ application-defined tags and that additionally enables such changes to be validated. In the context of this document reference to a markup file being valid is reference to the contents of a markup file being well-formed and ideally complying with the constraints expressed in an associated set of element type declarations. Where a markup file has no associated set of element type declarations or where strict compliance with the document type definition of the markup file is not required, the markup file is deemed to have a document type definition where each element has a content model of ANY and the content of the markup file is validated by ensuring the content is well-formed.

BRIEF SUMMARY OF THE INVENTION

Accordingly, the present invention provides a method of recordal of changes to a markup language file having application-defined tags wherein a delta file is created and changes to the contents of the markup language file are recorded in the delta file where the changes are validated against substantially the same markup language structure as the markup language file to be changed.

Ideally, the delta file is created using the same markup language as the markup language file to be changed. Also, preferably, the delta file is assigned a plurality of element type declarations determined from the element type declarations of the markup language file, the differences between one or more of the element type declarations of the delta file and the element type declarations of the markup language file being restricted to permissible differences with respect to the plurality of element type declarations of the markup language file.

Moreover, element instances that are not changed in the markup language file are preferably not recorded in the delta file. Also, each change recorded in the delta file is preferably recorded at the lowest element level.

The present invention additionally provides a method of generating a delta file containing data representative of one or more changes to a markup language file having application-defined tags, the delta file being created and changes to the markup language file being recorded in the delta file where the changes are validated against substantially the same markup language structure as the markup language file to be changed.

In a further aspect the present invention provides software for recording and validating changes to a markup language file having application-defined tags, the software consisting of a set of instructions for creating a delta file and recording in the delta file changes to the contents of the markup language file where the recorded changes are validated against substantially the same markup language structure as the markup language file to be changed.

The present invention also provides software for generating a delta file containing data representative of one or more changes to a markup language file having application-defined tags, the software consisting of a set of instructions for creating the delta file and recording in the delta file changes to the content of the markup language file, the changes being validated against substantially the same markup language structure as the markup language file to be changed.

The method of the present invention considers a markup language file as a structure of tagged data elements where the differences that are not significant, e.g. some occurrences of white space, can be ignored and where differences in the ordering of data can be ignored (unless, of course, they are significant). This makes the method particularly suited for use with more complex data files such as those used in CAD systems.

With the present invention the delta file, which contains a record of changes to be made or already made to a markup language file, can be viewed and processed as a markup language file in the normal manner. Also, the contents of the delta file follows the same nested markup structure as the structure of the markup language file that is changed. Although a DTD defining the structure of an XML file, for example, is not suitable for representing changes to files conforming to that DTD, with the present invention it is possible to ensure strict compliance of recorded changes with the DTD of the markup language file, particularly in the case of more complex data files, by generating a delta file that has a DTD which is only slightly modified with respect to the DTD of the original XML file. As the DTD of the delta file constrains the contents of the delta file and as the delta DTD is based upon and is only a slightly modified version of the original XML file DTD, changes recorded in the delta file, that are potential amendments to the original XML file, are constrained to conform substantially to the DTD of the original XML file. In this way the delta file generated with the present invention is able to prevent, as far as possible, invalid changes to the XML file being represented in the delta file. For example, where the original DTD specified a choice between two elements, and exactly one was required to be present in the file, the delta DTD would similarly require exactly one of these two elements or an exchange sequence where each item in the exchange is required to be one of the two original elements.

It will of course be immediately apparent that a file conforming to the DTD of the delta file may represent the differences between two existing markup language files or may represent a set of changes that are to be applied to an existing markup language file or differences that were previously applied to an existing markup language file. Furthermore, the contents of the delta file can be chosen to be bi-directional in which case the same delta file can be used to generate either markup file from the other or can be constrained so that the delta file can only be applied to one of the two markup files to generate the other.

The approach of basing a delta DTD on the DTD of the original markup language file has a number of advantages. These and other advantages of this invention include but are not limited to the following:

- the validation process ensures that the changes represented in the delta file are well-formed and, optionally, strictly compliant with respect to a DTD thus providing a robust change-control representation which is tightly coupled to the original DTD;
- processors designed to process files conforming to the original DTD can easily be modified to work on files conforming to the delta DTD;
- the delta file can be understood easily by a user familiar with the structure of the original files because the look and feel of the original DTD is maintained in the delta DTD;
- the size of the delta file is kept as small as possible;
- the delta file can be used as a basis for one or both of 'update' (convert the old version to the new) and 'undo' (convert the new version to the old) operations;
- multiple delta files can be incorporated into a single markup language document/file thus creating a revision history file;
- the delta file may contain the original data in addition to the changes and thus be the sole basis for generating one or other of the original files. Such a delta file is also useful in mergers of the two files where the operations to generate these can be defined as generic operations/transformations, for example using an XSL (XML Stylesheet Language) stylesheet that may be applied to any delta file
- data that is inherently order-independent can be handled;
- data that has 'keys' can be handled.

With the present invention, for example, a method is provided for making minimal modifications to any element type declaration so that it is capable of representing the differences between any two XML element instances which are both valid with respect to the original element type declaration. Such a process will work for any arbitrarily complex XML element type declaration or indeed for other markup language structures that are based on regular expressions with deterministic content models. The modifications are made in such a way that element instances which conform to the original element type declaration will also conform to the modified element type declaration.

The method can be applied to all element type declarations that define a particular document type and thus a delta format for that document type can be defined. Also, optimisations can be obtained by recursive application of the process from the top-level element type declaration down through the elements which it references to include only those changes that, for reasons related to the precise structure of the element type declarations, can occur in the particular document type.

In addition the method takes into account two common requirements of data structures which are not represented within a standard XML element type declaration, namely the ability to declare repeated items as being order-independent and to declare keys by which repeated element instances can be identified.

XML attributes are considered to be part of the data, and this means that a change to the value of an attribute needs to be recorded. Changes to the order of attributes are not significant.

The present invention is suited to applications involving the storage and communication of markup language data files particularly where the communication of data is over a network such as the internet. Furthermore, the present invention is suited to the merger of related files and the extraction of files from a merged document. Indeed, in a preferred embodiment the present invention provides a method and software for generating a delta file in which is stored a markup language file and changes to be made or that have been made to that file.

BRIEF DESCRIPTION OF THE SEVERAL VIEWS OF THE DRAWINGS

Embodiments of the present invention will now be described by way of example with reference to the accompanying drawings, in which.

DETAILED DESCRIPTION OF THE PREFERRED EMBODIMENTS

As mentioned above the structure of an XML file is specified by a set of element type declarations in a DTD. Any amendment of the XML file is only valid if it is valid for its DTD i.e. the XML file before the amendment is valid for its DTD and the XML file after the amendment is also valid for its DTD. The change recordal and validation software utilises the DTD of an XML file that is to be changed or an XML file that has already been altered in the generation of a delta file that records changes to the XML file. XML attributes are considered to be part of the data and so a change to the value of an attribute also needs to be recorded. However, changes to the order of attributes are not significant and are not recorded as changes.

Figure 1:
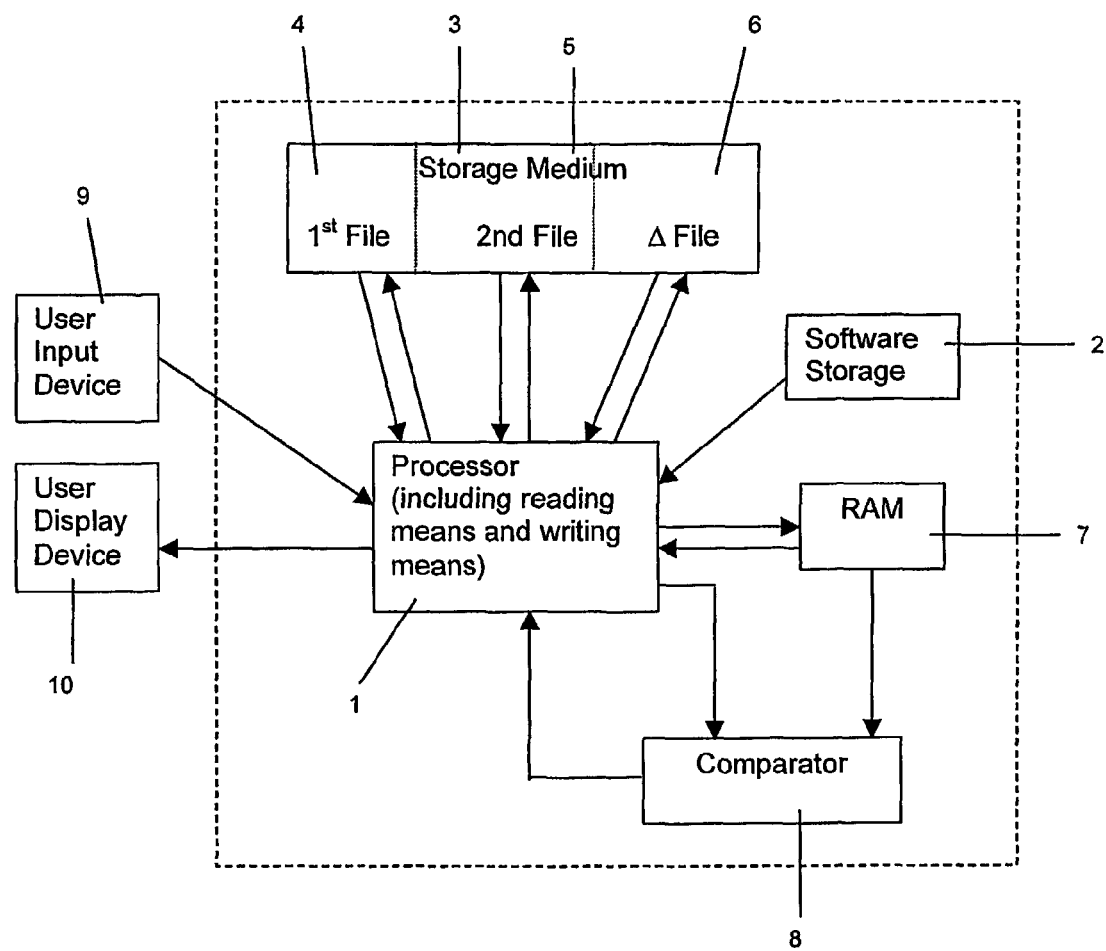
FIG. 1 illustrates the hardware requirements for a change recordal and validation software product.

As illustrated in FIG. 1, the change recordal and validation software requires the following resources: a processor 1 for carrying out the functional operations defined in the software; program storage 2; a data storage device 3 which for ease of reference may be sub-divided into first 4, second 5 and third 6 etc. storage regions; additional random access memory (RAM) 7 for temporary storage of data whilst the software is running; a comparator 8 for comparing the contents of XML files; and user input and output interfaces 9, 10. Most conveniently, the software is implemented on a conventional personal computer. However, the method of change recordal and validation of markup language files using application-defined tags described herein is not restricted to such an implementation.

Validation of Differences Between Two XML Files

Figure 2:
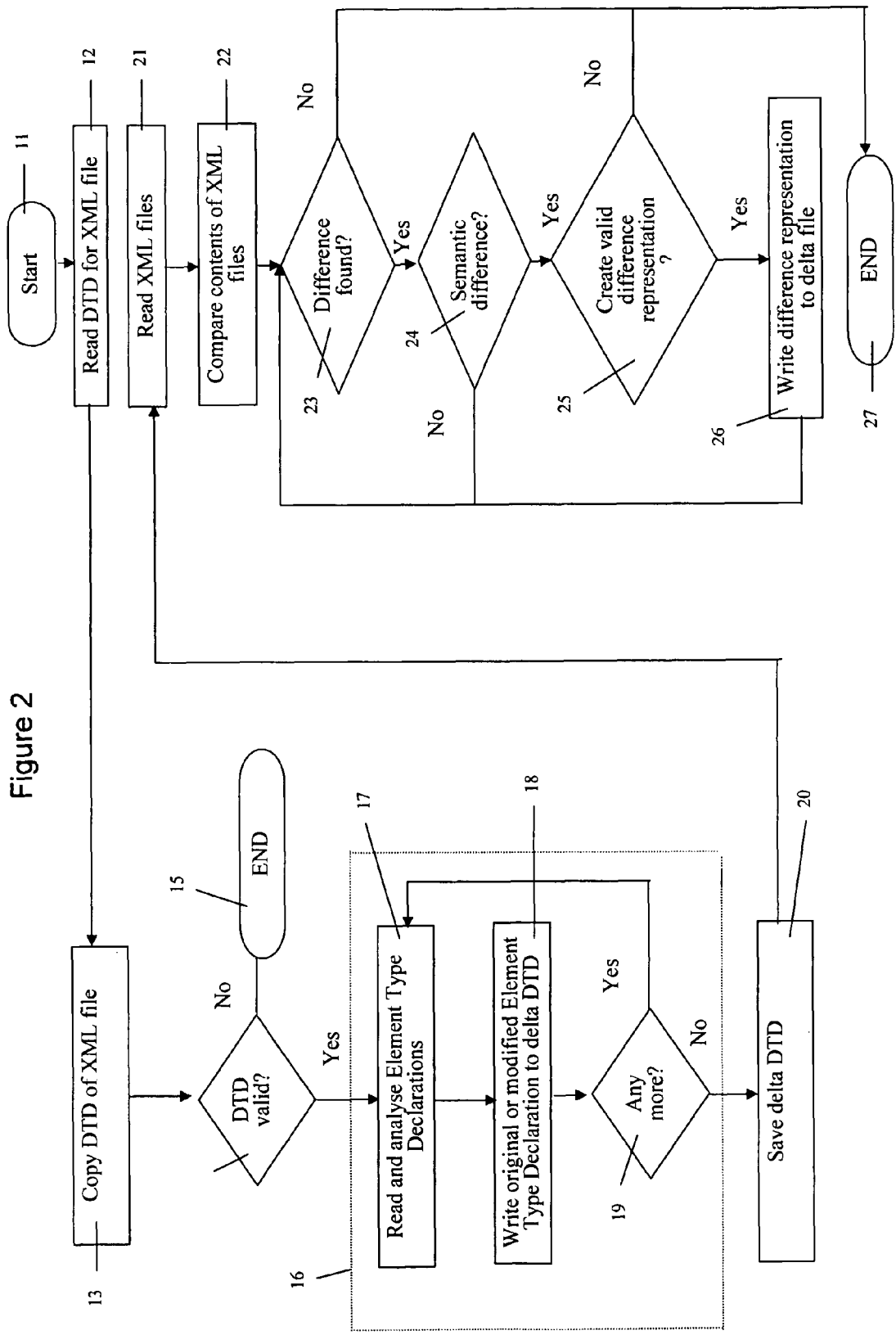
FIG. 2 is a flow diagram of operational steps performed by change recordal and validation software with respect to the identification and validation of changes between two XML files.

A method of recording differences between two XML files and ensuring strict compliance of the differences with the DTDs of the XML files using the change recordal and validation software described herein is illustrated in FIG. 2. The first and second XML files, that have differences between them, are either already stored in respective first and second storage regions 4, 5 of the data storage device 3 or are input by means of the input interface 9 to the data storage device 3.

Firstly a delta file must be created to which changes between the two XML files can be written. To create the delta file the change recordal and validation software is enabled 11 and the processor reads 12 the document type definition (DTD) of the first XML file and creates a copy 13 of the DTD. The copy of the DTD is validated 14 using conventional techniques. In the event the DTD is found not to be valid the program ends 15 and an error message may be displayed by means of the output interface 10. Where the copy of the DTD is found to be valid, a modified DTD which will be the delta DTD is generated 16. To generate the delta DTD each element type declaration in the copy of the DTD is read 17 and analysed to identify whether the element type declaration requires amendment. Rules pertaining to modification of each of the element type declarations in the generation of the delta DTD are illustrated in Table 1 below. In turn each element type declaration is either retained in its original form in the delta DTD or is modified in accordance with the rules and the modified version is written to the delta DTD 18. This process is repeated 19 until all element type declarations of the original DTD have been read and retained unamended or amended and the complete delta DTD is saved 20 to the third storage region 6 of the data storage device 3. The delta DTD may be saved as a separate file or may be saved as part of the XML delta file in which the differences between the two XML files are to be recorded.

Now that the delta DTD has been generated, data which represents differences between the first and second XML files can be written to an XML file that is constrained to the delta DTD. The first and second XML files are read 21 from storage regions 4, 5 and using the RAM 7 and comparator 8 the contents of the two XML files are compared 22 to identify differences between them. Where a difference between the two XML files is identified 23, the relevant element type declaration is checked to determine whether the difference is significant i.e. a semantic difference 24. If the difference is not significant then the processor 1 continues checking for any more differences. If the difference is a semantic difference, using the delta DTD a valid representation of the difference is generated 25 and written 26 to the delta file. The processor 1 then checks for any further differences 23. If a valid representation of the difference cannot be generated, i.e. the difference is found not to be valid for the delta DTD, the program ends and an error message may be issued via the output interface 10. This process is repeated until all differences between the two XML files have been analysed and where appropriate, the differences recorded in the delta file. Once no further differences are identified the program ends 27.

All semantic differences between the two XML files are recorded in the delta file and these include changes to the textual/visual data in the XML document as well as formatting and other command language contained in the XML files. It will, of course be apparent that this method may be altered so that instead of ending where an invalid difference is identified, in addition to generating an error message that is output via the output interface 10, the program may continue, skipping the invalid difference which may be stored in a separate text file for accessing by a user once the program has ended.

User Editing of an XML File

Figure 3:
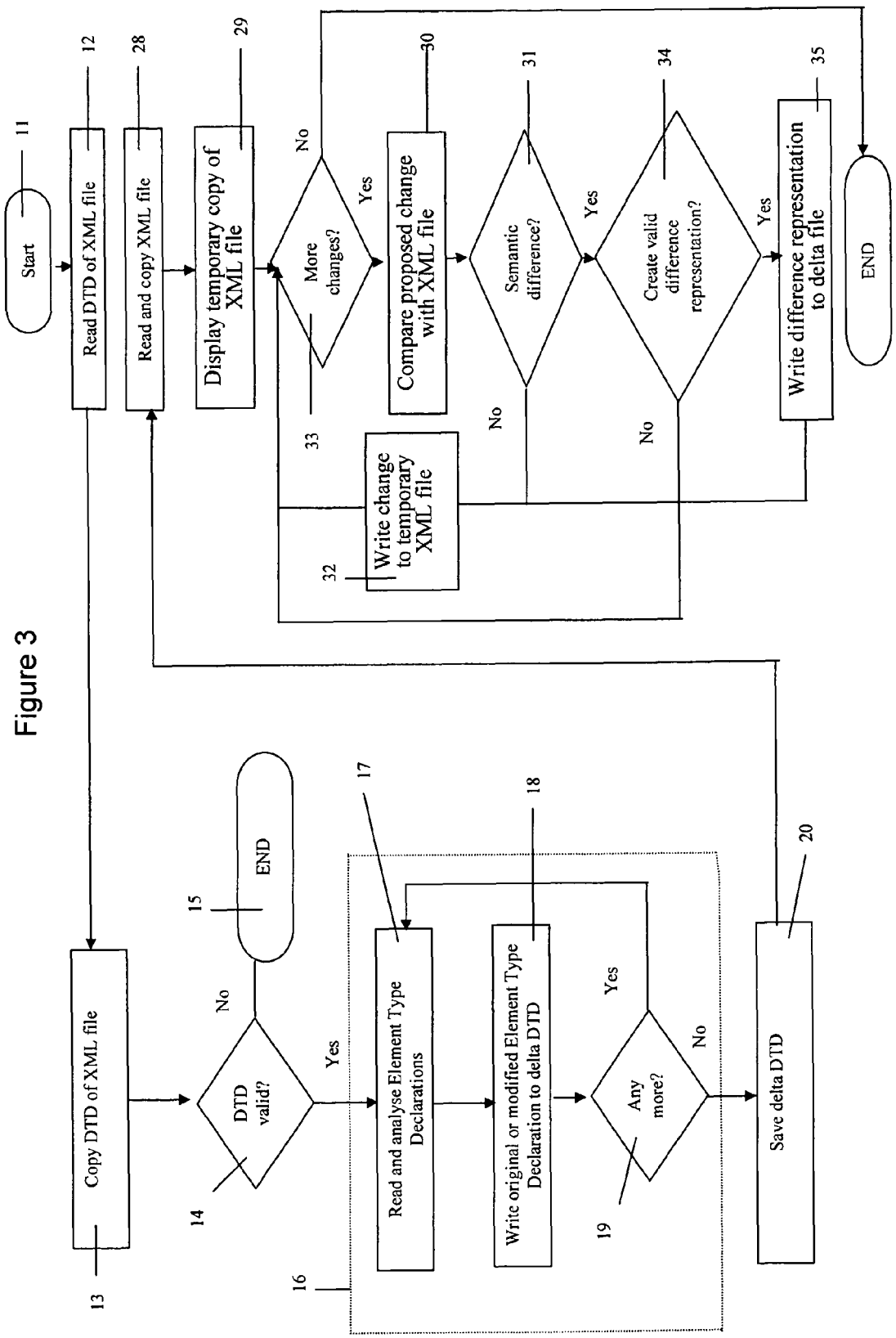
FIG. 3 is a flow diagram of operational steps performed by change recordal and validation software with respect to user input changes to an XML file.

The change recordal and validation software may also be used to record changes to a markup language file entered by a user via the input interface 9 or similarly changes made directly by an application program. FIG. 3 illustrates the method steps for recording changes to an XML file, like reference numerals are used where appropriate. With this method a single markup language file such as an XML file is stored in the first storage region 4 of the data storage device 3. The software is started 11 and, as before, initially the delta DTD is generated in the same manner as described above and is saved 20.

The XML file is read and a temporary copy made and stored 28 in the RAM 7. The temporary copy of the contents of the XML file is displayed 29 by means of the output interface 10 so that a user is able to input modifications to the XML file via the input interface 9. Each of the changes entered by the user is compared 30 to the temporary copy of the XML file and checked 31 to establish whether the modification is significant i.e. a semantic change. Where the modification is not significant the change is written 32 to the temporary version of the XML file in the RAM 7 but no record of the change is entered in the delta file and the processor 1 checks 33 whether any further changes have been entered by the user. Where the modification is identified as a semantic change, the processor checks 34 whether a valid difference representation of the change can be generated using the delta DTD. Where a valid difference representation is possible, the difference representation is written 35 to the delta file and the change written to the temporary copy of the XML file 32 with the processor checking 33 for any further modifications entered by the user. If the change proposed by the user is invalid, an error message is issued via the output interface to the user and the change is deleted from the delta file and from the temporary XML file in the RAM 7 and the program ends. Alternatively, whilst deleting the change from the delta file and the temporary file, the program may issue an error message via the output interface to the user.

Once the user has finished entering modifications to the XML file and all of the modifications have been found to be either not significant or valid semantic changes, the temporary version of the XML file in the RAM 7 is written over the original XML file in the first storage region 4. Of course, the modified version of the XML file may be stored separately from the original version of the XML file instead of overwriting the original XML version.

As the delta file contains all of the valid semantic modifications to the original XML file, an equivalent to the original XML file can be recreated from the modified XML file through reverse implementation of the changes stored in the delta file. In this way the delta file can be used as an historical record of changes to an XML file.

Where a delta DTD is not generated, the content of the delta file is made to reflect the structure of the original files and to be well-formed. Thus, in the cases of FIGS. 2 and 3 the method steps illustrated on the right-hand side of the figures are performed in the same way although the difference representation performed in box 25 and in box 34 will be based on a content model of ANY rather than a content model specified in a DTD.

Generation of the Delta DTD

In accordance with the methods described above each element type declaration governing the first XML file is examined and modified by the processor 1 to create the delta DTD. Below, in Table 1, are set out the core rules that are applied in defining the changes that must be made to an XML DTD in order to create a derived DTD that will govern the delta file. The DTD of the delta file and the DTD of the original markup language file are substantially identical in that the nested structure of the contents of the delta file and the original file will be substantially the same. However, certain slight modifications are necessary to enable the delta file to represent the changes to a markup language file. All of the element type declarations are either copied across to the delta DTD or amended and the element type declarations are processed to the lowest level of each content particle. The rules provide one embodiment of an implementation but this does not preclude others based for example on the generation of different element declarations rather than the use of attributes and/or the use of XML Namespaces and/or the use of XML Schema the contents of which are incorporated herein by reference. Table 2 illustrates how unique XML Schema features would be represented in a delta file. In other respects, the process of creating a delta XML Schema to validate differences between two files conforming to an XML Schema specification follows the same principles as that of creating a delta DTD except that the syntactic representation of DTDs and XML Schemas of course differ.

These tables show how different types of content particle used within elements are modified to generate the delta DTD or XML Schema. In the case of Table 1 a content particle is part of an element type declaration and consists of element names, choice lists of content particles, or sequence lists of content particles.

New Elements

As mentioned above, the delta DTD includes certain new elements. The names of these new elements are not significant but the purpose of each is important and needs to be known to the processing system. This could be achieved in a number of ways including the use of fixed names or fixed XML attribute values. In Table 3 below, the new elements are assumed to be named as in the table but this is not a requirement. The use of namespaces, especially when using XML Schema, provides a way of ensuring that the names of these elements and any additional attributes do not clash with any names in the original files, e.g. by applying a 'deltaxml:' prefix linked to a unique namespace.

TABLE 1

Changes to Content Particles

| Content Particle Type | Description | Example(s) | Delta CP for Example | DTD Modifications |
| --- | --- | --- | --- | --- |
| parentheses | Simple bracket containing a single item, i.e. element or content particle | (x)<br>((x, y)) | (x)<br>((x, y)) | No change. Content particles within the parentheses are processed according to their structure. |
| required element | Item is an element which is not ?*+ | x<br>y | x<br>y | No change. |
| optional element | Item is an element which is optional, ? | x?<br>y? | x?<br>y? | No change. |
| repeated optional element | Item is an element which is * | x*<br>y* | x*<br>y* | No change. |
| repeated required element | Item is an element which is + | x+ | (x+ | repeatedItemsUnchanged) | The repeated required element is incorporated into a new choice content particle that also allows repeatedItemsUnchanged. |

TABLE 1-continued

Changes to Content Particles

| Content Particle Type | Description | Example(s) | Delta CP for Example | DTD Modifications |
|---|---|---|---|---|
| sequence | Content particle is a sequence with no ?*+ | (x, y)<br>(x, (y, z)?, a) | (x, y)<br>(x, (y, z)?, a) | No change. The content particle for each sequential item is processed according to its structure. |
| optional sequence | Content particle is a sequence with ? | (x, y)?<br>(x, (y, z)?, a)? | (x, y)?<br>(x, (y, z)?, a)? | No change. The content particle for each sequential item is processed according to its structure. |
| repeated optional sequence | Content particle is a sequence with * | (x, y)*<br>(x, (y, z)?, a)* | (x, y)*<br>(x, (y, z)?, a)* | No change. The content particle for each sequential item is processed according to its structure. |
| repeated required sequence | Content particle is a sequence with + | (x, y)+<br>(x, (y, z)?, a)+ | ((x, y)+ \| repeatedItemsUnchanged)<br>((x, (y, z)?, a)+ \| repeatedItemsUnchanged) | The content particle for each sequential item is processed according to its structure and the resultant repeated required sequence is incorporated into a new choice content particle that also allows repeatedItemsUnchanged. |
| required choice | Content particle is a choice with no ?*+ | (x \| y \| z) | ((x \| y \| z \| (exchangeStartSingle, (x \| y \| z), exchangeMiddle, (x \| y \| z), exchangeEnd)) | A new exchange sequence is formed where the content particle between the exchangeStartSingle and exchangeMiddle is the original content particle, and the content particle between the exchangeMiddle and exchangeEnd is the original content particle. Each of the items in the original choice is processed according to its structure, and a new required choice content particle formed from these items and the new exchange sequence. |
| optional choice | Content particle is a choice with ? | (x \| y \| z)? | ((x \| y \| z \| (exchangeStartSingle, (x \| y \| z), exchangeMiddle, (x \| y \| z), exchangeEnd))? | The processing is as for a required choice except that the result is an optional choice rather than a required choice. |
| repeated optional choice, ordered | Content particle is a choice with * | (x \| y \| z)* | ((x \| y \| z \| (exchangeStart, (x \| y \| z), exehangeMiddle, (x \| y \| z), exchangeEnd))* | The processing is as for a required choice except that the result is an repeated optional choice rather than a required choice. |
| repeated optional choice, unordered | Content particle is a choice with * | (x \| y \| z)* | (x \| y \| z)* | No change. The content particle for each choice item is processed according to its structure. |
| repeated required choice, ordered | Content particle is a choice with + | (x \| y \| z)+ | (((x \| y \| z \| (exchangeStart, (x \| y \| z), exchangeMiddle, (x \| y \| z), exchangeEnd))+ \| repeatedItemsUnchanged) | The processing is as for a required choice except that the result is an repeated optional choice rather than a required choice, and this is then incorporated into a new choice content particle which also allows repeatedItemsUnchanged. |
| repeated required choice, unordered | Content particle is a choice with + | (x \| y \| z)+ | ((x \| y \| z)+ \| repeatedItemsUnchanged) | The content particle for each choice item is processed according to its structure, and the result is a repeated required structure which is incorporated into a new choice content particle which also allows repeatedItemsUnchanged. |

TABLE 2

| XML Schema feature | Delta Schema Modifications |
|---|---|
| A combination type, "all", can be applied to a set of elements to indicate that each may occur at most once but in any order. | The delta Schema for an "all" is the same as the original. |
| MIXED content can be controlled more precisely. | Handled as MIXED in deltaDTD, ignoring the structure of the elements. For improved validation a more complex delta Schema could be generated. |
| Local elements can be defined. | These elements can be processed into delta elements in the same way as non-local elements but the resultant delta element remains as a local element definition. |
| Restrictions, extensions, groups and other structural components | These need to be expanded out before a delta process is applied. |
| PCDATA and attribute types | Handled as in delta DTD but more sophisticated comparison functions can be written to detect the case where items are the same, e.g. "6 June 2001" and "6/6/2001". For improved validation, additional elements can be defined to handle changes to structured PCDATA in a structured way. |
| namespaces | Namespaces are handled in XML Schema but not in DTDs. Generation of a delta schema can be applied to each schema file which represents a target namespace. |
| substitution groups | These can be resolved to choices and treated as normal choices. |
| Element occurrences can be controlled by minOccurs/maxOccurs with numeric values other than 0 or 1 (DTD only allows 0, 1 and 'unbounded' for maximum) | Can be treated '*' or as '+' as appropriate. For improved validation, occurrence limits could be set in the delta schema. |

TABLE 3

| Element type name | Content | Purpose |
|---|---|---|
| exchangeStart | EMPTY | Introduces the start of an exchange sequence. In some complex content particles, it is necessary to have more than one element of this type declared. A suffix may be added to distingush cases where the exchange sequence |

TABLE 3-continued

| Element type name | Content | Purpose |
| --- | --- | --- |
| exchangeMiddle | EMPTY | cannot be repeated, e.g. exchangeStartSingle Denotes the mid-point of an exchange sequence |
| exchangeEnd | EMPTY | Denotes the end-point of an exchange sequence |
| PCDATAmodify | (PCDATAold, PCDATAnew) | Records a change to PCDATA |
| PCDATAold | #PCDATA | Records the original PCDATA content |
| PCDATAnew | #PCDATA | Records the new PCDATA content |
| MIXEDmodify | (MIXEDold, MIXEDnew) | Records a change to MIXED content |
| MIXEDold | ANY | Records the original MIXED content |
| MIXEDnew | ANY | Records the new MIXED content |
| repeatedItemsUnchanged | EMPTY | Records that for a content particle that is repeated at least once (denoted by '+' in the DTD), all items were unchanged. In some complex content particles, it is necessary to have more than one element of this type declared. |

In addition to instances of the above elements, each element instance in a delta file is present for one of a number of different reasons. These are enumerated in Table 4 and are known as difference types:

TABLE 4

| Difference Type | Meaning | Constraints |
| --- | --- | --- |
| originalData | No differences - this is part of the original data, either in the 'old' file or the 'new' file. | Applies to all element instances which are contained in any element instance with "unchanged", "add" or "delete". |
| unchanged | Specifies that the element instance is unchanged. | No nested element instances or attributes are needed within the element instance. |
| add | Specifies that this element instance is to be added (present in the 'new' file but not in the 'old'). | All element instances between an exchangeMiddle and exchangeEnd will have this value. |
| delete | Specifies that this element instance is to be deleted (present in the 'old' file but not in the 'new'). | All element instances between an exchangeStart and exchangeMiddle will have this value. |
| modify | Specifies that this element instance is modified | Specifies that this element instance is modified, so all element instances directly within this will either correspond to elements in Table 2 or will have values of "unchanged", "add", "delete" or "modify". |

The top-level element instance in a document could have a difference type of "unchanged" or "modify". Element instances below the top-level element instance will follow the constraints given in the tables. Difference types do not apply to instances of elements in Table 3.

The difference type of each element in the delta file also needs to be represented in some way, e.g. using an attribute value. In the examples below, an attribute with the name "delta" is used and has values according to the table above, except that originalData is not specified but is taken as the default value.

The following are examples of valid changes that may be made to the element type declarations of a DTD with reference to their content. Elements whose content is #PCDATA will have their content changed from:

```
(#PCDATA) or (#PCDATA)*
to    (#PCDATA | PCDATAmodify)*
For example, the element type declaration:
    <!ELEMENT comment (#PCDATA)>
would become:
    <!ELEMENT comment (#PCDATA | PCDATAmodify)*>
The representation of the differences between:
    <comment>This is a comment</comment>
and:
    <comment>This is another comment</comment>
would be represented in the delta file as:
    <comment delta="modify"><PCDATAmodify>
    <PCDATAold>This is a comment</PCDATAold>
    <PCDATAnew>This is another comment</PCDATAnew>
    </PCDATAmodify></comment>
It is also possible to use the structure for a finer-grained change, for example:
    <comment delta="modify">This is <PCDATAmodify>
    <PCDATAold>a </PCDATAold>
    <PCDATAnew>another </PCDATAnew>
    </PCDATAmodify>comment</comment>
```

The above examples would create a bi-directional delta file. Where the delta file is only required to detail changes from the 'old' document to the 'new', the same change could be represented in the delta file as:

```
<comment delta="modify"><PCDATAmodify>
<PCDATAold/>
<PCDATAnew>This is another comment</PCDATAnew>
</PCDATAmodify></comment>
```

As the structure of the delta file follows the structure of the 'old' file and so is ordered and well-formed, the relevant comment in the 'old' file that is to be modified is automatically identifiable. Of course, a similar directional delta file could be generated that contains only the information necessary to convert a 'new' file back into the 'old' file. This enables the delta file to be even smaller in size than one that is bi-directional. This optimisation cannot always be applied, e.g. when some of the elements in the file are treated as unordered and do not have keys.

MIXED content elements can be treated in a similar manner to #PCDATA. Note that the items within the MIXEDmodify element may have elements as well as PCDATA in them. For example:
    <!ELEMENT mixedContentExample (#PCDATA |a|b)*>
        would become:
<!ELEMENT    mixedContentExample    (#PCDATA |a|b|MIXEDmodify|PCDATAmodify)*>
MIXED content is generally considered to be ordered.
Content of ANY is similar to MIXED and so is handled as follows.
    <!ELEMENT anyContent ANY>
would become:
    <!ELEMENT anyContent ANY>
but within this, MIXEDmodify or PCDATAmodify would be used to denote changes. As for MIXED content, ANY is also generally considered to be ordered.

A set of three element types denotes exchanges of element instances within a document. An exchange is the replacement of zero or more element instances, which conform to a content particle in the element declaration, with another list of zero or more element instances conforming to the same content particle definition. An exchange sequence is represented as:

<exchangeStart>xx<exchangeMiddle>yy<exchangeEnd> where 'xx' is the data for zero or more element instances from the first file, and 'yy' the data for the same content particle in the second file. Each element within xx will have a delta attribute set to "delete" and each element within yy will have a delta attribute set to "add". It should be noted that in some complex nesting of content particles, it is necessary to have different exchangeStart elements in order to keep the element content model deterministic. In these cases new exchangeStart elements could, for example, be generated using a '1', '2' etc. suffix.

Where optional items, denoted in an XML DTD using '*' and '?', are equal in the first and second XML files there will be nothing in the delta file.

However, where an item is required in the DTD of the original XML file, there will always be something present in the delta file. For a single required item, where there are no differences between the first and second XML files, the element that was present in both files will also appear in the delta file and it will have a delta attribute with value "unchanged", and no content. This means that any element that could be unchanged in the delta file must have an element declaration that allows it to be empty or is amended to allow it to be empty.

In the case of a repeated required item, denoted by '+' in an XML DTD, if all items are equal in both files, there will be a single element in the delta file:

<repeatedItemsUnchanged/>

It should be noted that in some complex nesting of content particles, it is necessary to have different repeatedItemsUnchanged elements in order to keep the element content model deterministic. In these cases new repeatedItemsUnchanged elements could, for example, be generated using a '1', '2' etc. suffix.

The order of elements within an XML document is normally significant. However, in many cases the order of data elements may not be significant and this method allows for such a situation to be specified so that it can be handled in the generation of the delta DTD and in the comparisons. The precise way in which this is specified is not important. Any repeating content particle, including individual elements, may be specified to be unordered. In this case the occurrences of this content particle in the document may occur in any order. However, this does not imply that the content particles within it are unordered.

The effect on the generation of the delta version of a content particle is that the exchange form is not required, as noted in Table 1.

XML has no concept of keys to the items within a document although this is a common feature of many data structures. Therefore this method allows the possibility that an item may have a key. A key is defined as some aspect of an element that is unique within the element that contains it. Two element instances that correspond with the same element type declaration, are in the same content particle occurrence in two documents, and have equal keys are considered to represent the same item, i.e. can be compared.

The effect of this on the delta document is that the constituent parts of the key need to be present in the delta XML file so that navigation can be repeated through the structure. There is no direct effect on the delta version of a content particle due to the presence of keyed items within it. There is no restriction on what constitutes a key: this could include attributes or elements and these may be required or optional.

Attributes are treated in the same manner as data in that any change will be recorded in the delta file.

Attributes of type ID and IDREF in the original DTD are changed to be of type NMTOKEN in the delta file. Similarly, attributes of type IDREFS are changed to be of type NMTOKENS. The reason for this is that the delta file may contain two ID attributes with the same value, because they come from different files. Similarly, an IDREF attribute may reference an ID that is not present in the delta file, so it cannot remain of type IDREF.

Attributes that were #REQUIRED are changed to be #IMPLIED. The reason for this is that unchanged attributes are not present in the delta file unless they are part of a key.

Any changes to attributes need to be recorded. This could be done in any way, e.g. by using two new attributes which contain in an encoded form both the names and the values of the attributes. With this implementation:

one attribute contains the details of all attributes in the original file which are not present or have changed in the new file, the other attribute contains the details of all attributes in the new file that were absent or different in the original file, and unchanged attributes do not normally need to appear in the delta file.

A characteristic of the delta file is that the changes specified can be applied successfully to files other than the original files that were used to generate the delta file. This might enable, for example, changes made to a file A to produce B to be applied to a new version of A, denoted as A' to produce B'. This works predictably when certain conditions are met regarding the relationship between A and A'. For example, the file Δ which represents the differences between two files A and B can be applied to another file A' which is some derivative of A such that:

all items in A that are modified in Δ are present in A' the position in the XML tree of items modified in Δ are the same in A'0 as in A, where position may be related to order or keys as appropriate.

The following are some examples of element declarations and the way that they will be modified in the delta DTD. Instances of the elements are also given to show how the differences are represented.

In the case of a single required element within another element an example of an element declaration is:

```
<!ELEMENT ex1 (x)>
<!ELEMENT x (#PCDATA)>
The resultant delta element declaration is:
<!ELEMENT ex1
(x)?>
<!ATTLIST ex1
delta (modify | unchanged | originalData) #IMPLIED
new-attributes CDATA #IMPLIED
old-attributes CDATA #IMPLIED
<!ELEMENT x
(#PCDATA | PCDATAmodify)*>
<!ATTLIST x
delta (modify | unchanged | originalData) #IMPLIED
new-attributes CDATA #IMPLIED
old-attributes CDATA #IMPLIED
```

In the above, as x is required it cannot be added or deleted and so the delta attribute does not allow these values. The delta element declaration makes (x) optional so that in the case where ex1 is unchanged, no data need be included within it.
For example:

```
Input file 1:   <ex1><x>a b c</x></ex1>
Input file 2:   <ex1><x>x y z</X></ex1>
Delta file element:
  <ex1 delta="modify">
  <x delta="modify"><PCDATAmodify>
  <PCDATAold>a b c</PCDATAold><PCDATAnew>x y z</PCDATAnew>
  </x></ex1>
```

For a repeated optional element that is within another element and where the order is not significant, the information may be represented using a FIXED attribute.
For an element declaration:

```
For an element declaration:
    <!ELEMENT ex2 (x*)>
    <!ATTLIST ex2 not-ordered CDATA #FIXED "x">
    <!ELEMENT x (#PCDATA)>
The resultant delta element declaration is:
    <!ELEMENT ex2
    (x*)>
    <!ATTLIST ex2
    delta (modify | unchanged | originalData) #IMPLIED
    new-attributes CDATA #IMPLIED
    not-ordered CDATA #FIXED "x"
    old-attributes CDATA #IMPLIED>
    <!ELEMENT x
    (#PCDATA)>
    <!ATTLIST x
    delta (add | delete | originalData) #IMPLIED
    new-attributes CDATA #IMPLIED
    old-attributes CDATA #IMPLIED>
For example:
Input file 1: <ex2><x>a b c</x><x>x y z</x></ex2>
Input file 2: <ex2><x>!x y z!</x><x>a b c</x><x>c d e</x></ex2>
Delta file element:        <ex2 delta="modify">
                           <x delta="delete">x y z</x>
                           <x delta="add">!x y z!</x>
                           <x delta="add">c d e</x>
```

There are some differences here as compared to the ordered case. As the instances of x are not in order, there is no way to work out which ones correspond, it is only possible to say which ones are present in both files and which are not. Therefore, it is not possible to 'modify' any particular instance, it is only possible to identify instances that have been added and ones that have been deleted. Occurrences that have not changed will not appear in the delta file, so there is no possibility of having an instance of x with a delta attribute of 'unchanged'.

The following example illustrates how it is possible to optimise the delta DTD, that is to avoid allowing for changes in elements that cannot be changed because of the way that they are used.
Thus the element declaration might be:

```
<!ELEMENT ex3 (x+)>
<!ATTLIST ex3 not-ordered CDATA #FIXED "x">
<!ELEMENT x ((y | z)+)>
<!ELEMENT y (#PCDATA)>
<!ELEMENT z (#PCDATA)>
```

The element instances of x within ex3 are not ordered. Therefore any instance that is unchanged will not appear in the delta file, and as it is not possible to identify which instances have changed, it is also not possible to modify an instance of x. By implication therefore, it is not possible to have a modification of y or z.

The resultant delta element declaration is thus:

```
<!ELEMENT ex3
((x+ | repeatedItemsUnchanged))?>
<!ATTLIST ex3
delta (modify | unchanged | originalDATA) #IMPLIED
new-attributes CDATA #IMPLIED
not-ordered CDATA #FIXED "x"
old-attributes CDATA #IMPLIED
<!ELEMENT repeatedItemsUnchanged EMPTY>
<!ATTLIST repeatedItemsUnchanged
deltaElement CDATA #FIXED "repeatedItemsUnchanged">
<!ELEMENT x
(y | z)+>
<!ATTLIST x
delta (add | delete | originalData) #IMPLIED
new-attributes CDATA #IMPLIED
old-attributes CDATA #IMPLIED>
<!ELEMENT y
(#PCDATA)>
<!ELEMENT z
(#PCDATA)>
```

In the delta DTD, the only possible delta attribute values for x are add and delete. As x cannot be modified, its structure has not been changed and items below it do not need to have a delta attribute as they will always be part of the original data.

```
Input file 1:
    <ex3>
    <x><y>a b c</y></x>
    <x><z>a b c</z></x>
    <x><y>c d</y></x>
    </ex3>
Input file 2:
    <ex3>
    <x><y>c d</y></x>
    <x><z>c b a</z></x>
    <x><y>a b</y></x>
    </ex3>
Delta file element:
    <ex3 delta="modify">
    <x delta="delete"><y>a b c</y></x>
    <x delta="delete"><z>a b c</z></x>
    <x delta="add"><z>c b a</z></x>
    <x delta="add"><y>a b</y></x>
    </ex3>
```

In this example, the instance <x><y>c d</y></x> appears in both files and so is not present in the delta file. The other two items are different and are therefore deleted and new items added.

In the examples given above the delta file contains only data on changes to a markup language file or between two markup language files. It is also possible for the delta file to contain all of the original data from a markup language file as well as the changes to be made to the file. Such a combination of the original data with the changes is referred to as a 'full' delta file and where a delta DTD has been generated the full delta file can be validated against this delta DTD. Full delta files are particularly useful where mergers between files are required but have the disadvantage of being larger in size than standard delta files recording only changes. The following illustrates the differences between a standard delta file and a full delta file.

```
For:
    <!ELEMENT ex4 (x*)>
    <!ELEMENT x (#PCDATA)>
with a corresponding delta DTD of:
    <!ELEMENT ex4 (x*)>
    <!ELEMENT x (#PCDATA | PCDATAmodify)*>
Input file 1: <ex4><x>first</x><x>second</x><x>third</x></ex4>
Input file 2: <ex4><x>first!</x><x>second</x><x>third</x></ex4>
The standard delta file in which unchanged data is omitted is:
    <ex4 delta="modify">
      <x delta="modify"><PCDATAmodify>
        <PCDATAold>first</PCDATAold>
        <PCDATAnew>first!</PCDATAnew></PCDATAmodify>
      </x>
      <x delta="unchanged"/>
      <x delta="unchanged"/>
    </ex4>
The full delta file in which all the data contents of elements are retained is:
    <ex4 delta="modify">
      <x delta="modify"><PCDATAmodify>
        <PCDATAold>first</PCDATAold>
        <PCDATAnew>first!</PCDATAnew></PCDATAmodify>
      </x>
      <x delta="unchanged">second</x>
      <x delta="unchanged">third</x>
    </ex4>
```

The result of a comparison between two files can be represented as a full delta as described above containing both changes and the original data. The process for extracting from the full delta file either of the original files is straightforward and in effect the full delta is a merge of the two original files represented in a highly structured way such that the origin of any changed data and conflicts between the two files can be determined.

It is possible to use a full delta file FD that represents the difference between two files A and B and where the FD is valid with respect to a delta DTD as a basis for merging the two files A and B such that the resultant merged file M is valid with respect to the original DTD. The merge can be achieved by including in the merged file M all data with delta values equal to "add" and "delete" and selecting either the data from A or the data from B in cases where an exchange is specified unless the exchanged content particles are permitted by the DTD to be repeated in which case both may be included. Typically user interaction is required to achieve a specific desired result unless it is always the case that either the old or new data is to take precedence for inclusion in the merged file. However, building the merge process on top of a valid full delta file simplifies the merge software considerably.

In the case where both A and B are themselves modifications of some common base file X, it is possible to use the delta process for a three-way merge as follows. A delta file is generated from the difference between X and B and this delta file is then applied to A. Note again that some user interaction is needed to produce specific results where there are conflicts between the changes made in A and B.

To minimise user interaction the merger can be made fully automatic by distinguishing between an exchangeStart/Middle/End sequence in which a content particle may be repeated and such a sequence in which a content particle is allowed only once. For an automated merger if the content particle is allowed only once one or other must be included in the output file, otherwise both may be included. This is simply achieved by adopting a different element name for these two cases. With this change a generic script can be written to generate a merged file directly from a full delta file.

With the method and software for performing the method described above, changes of a markup language file, e.g. an XML file, that utilises application-defined tags may be defined in a separate file, the delta file, that is also an XML file and which conforms to a delta DTD derived from the DTD of the original XML file where a delta DTD is employed. In this way the constraints of the original XML file similarly apply to the delta file. As a result of this the delta file is able to validate the changes by ensuring the data recording the changes is well-formed or ideally strictly complies with the delta DTD, when a DTD is employed, thus providing a robust change-control representation which is tightly coupled to the original XML file. Moreover, users familiar with the structure of the original XML file will easily familiarise themselves with the delta file. Furthermore, by utilising the structure of the original XML file, data on the changes to the XML file can be compressed so that the delta file is made as small as possible. In particular, those element instances for which no change is recorded are noted as unchanged without compromising the structure of the original markup language file. To the extent that the delta file is concerned with semantic modifications only, the method and software described above analyses and generates a delta file on the basis of the structure of the XML file as defined by the DTD rather than treating each line of the XML file as a line of text.

It will, of course, be apparent that the validation of changes to the markup language file is inherent from the structure assigned to the delta file. There is therefore no need for a separate validation step to be taken to ensure the changes to the markup language file are valid. The creation of a delta file, in accordance with the method described above, however unintentionally, provides validation of the changes proposed to a markup language file and recorded in the delta file. Of course, the validation of the changes only applies to potential amendments to the markup file. For example, where a change such as 'delete chapter 4' is recorded in the delta file but there is no chapter 4 in the original markup language file, this is not a potential amendment. However, if the original markup language file contained a chapter 4 that was a 'required' item then a change recorded in the delta file to delete chapter 4 may be found not to comply with the delta DTD i.e. the entry would not be a valid entry.

An application of the method and software for generating delta files is to permit multiple versions of a markup language file to be contained in a single markup file in such a way that only minimal data is held in the file and any version can be re-generated, as required. An example application for this is when a DTD is updated but a publisher wishes to publish data that conforms not only to the latest DTD but to previous versions also. The previous versions are all, typically, small variations of the latest version which makes it sensible to store them as delta files.

Consider a case of several versions of a data file V1, V2, V3, V4 where V4 is the latest version. Storing all of these in a single file would enable any to be retrieved but it would be too large a file. So, with the present invention, the following can be stored instead: delta(V4−V1), delta(V4−V2), delta(V4−V3) and V4. This would be a much smaller file and any version could be retrieved simply by applying the appropriate delta. For example, to generate V2 apply re-combination to (V4+delta(V4−V2)) to get V2 again. It will be apparent, that with V4 included the delta files need be only unidirectional providing a further reduction in file size.

This approach works for any changes between versions other than for changes to the root element as there is no delta DTD involved in this.

Similarly, the possibility of storing delta files which enable different versions of data to be recreated is of direct application to database storage. Databases are now being revised to store XML directly and the present invention provides a way of storing XML in databases in a way that uses as little storage as possible. A delta file without a DTD would provide storage for any versions of XML data which in some cases may be the preferred option. A delta file with a DTD would provide more accurate and smaller delta files but the original files would, of course, have to conform to the same DTD.

The present invention is also of relevance to the communication of data and in particular to the communication of data over networks. As delta files may be made considerably smaller than the actual data files that are being changed, the communication of delta files rather than the complete files over a network would be both more reliable and significantly faster. This is particularly important in the arena of the services offered by ASPs (Application Service Providers) over the web. An ASP may offer a service for performing a complex analysis of some engineering data. Very often the original data and the results are represented as XML data and in some cases these could be very large data files. Where the process is interactive, for example send data, get results, modify data, send new data, get new results etc., the present invention can greatly reduce the bandwidth required, improve the speed with which this data can be communicated between the user and the ASP which would have a consequential increase in the reliability in the data transfers. Moreover, the use of delta files in the transfer of information over a public network provides added security as an unauthorised recipient is not able to extract useable data from the delta file alone.

Delta XML middleware can be inserted in the pipeline between the user and the ASP so that only delta files need to be sent over the network. Of course, the full data file must be sent the first time but thereafter only delta files would be required. Furthermore, these are circumstances where a choice may be made between the adoption of bi-directional delta files or unidirectional delta files.

As can be seen there are applications of the present invention in the internet environment. Indeed, delta files may be used in the accessing and downloading of web pages over the internet. This is particularly of use with static web pages where part of the pages such as the header remains the same. For example, instead of a hyperlink on a web page identifying a new page to access, the hyperlink identifies the relevant delta file to be accessed which communicates only the changes to be made to the existing web page to generate the new page selected. This is particularly of significance with the increasing use of WAP (Wireless Application Protocol) and WML (Wireless Markup Language) and related telephony technology for accessing data from the internet etc.

It will, of course, be apparent from the examples given above that the present invention has many applications in the fields of data management and communication of which the above are only a cross-section and are non-limiting. Many other uses of the present invention are envisaged as are steps, other to those described above, that may be employed to generate delta files in accordance with the present invention.

The invention claimed is:

1. A method of recordal of changes to a markup language file having a document type definition (DTD) or XML (Extensible Markup Language) Schema, wherein the method comprises the following steps:
    creating a delta file;
    assigning to the delta file a document type definition (DTD) or XML Schema which defines element types corresponding to the element types of the document type definition (DTD) or XML Schema of the markup language file, the element types of the delta file having the same constraints on the type, number and order of the document type definition elements or the XML Schema element types as the constraints defined in the document type definition (DTD) or XML Schema of said markup language file; and
    recording in the delta file either:
    i) only changes to the contents of said markup language file such that element instances not changed in the markup language file are not recorded in the delta file, or
    ii) all the data of the markup language file and the changes to the markup language file,
    in each case the changes recorded in the delta file being validated against a document type definition (DTD) or XML Schema which is substantially the same as the document type definition (DTD) or XML Schema of said markup language file.

2. A method as claimed in claim 1, wherein each change recorded in the delta file is recorded at the lowest element level.

3. A method of generating a delta file containing data representative of one or more changes to a markup language file having a document type definition (DTD) or XML Schema, the method comprising the steps of:
    creating a delta file;
    assigning to the delta file a document type definition (DTD) or XML Schema which defines element types corresponding to the element types of the document type definition (DTD) or XML Schema of the markup language file, the element types of the delta file having the same constraints on the type, number and order of the document type definition elements or the XML Schema element types as the constraints defined in the document type definition (DTD) or XML Schema of said markup language file; and
    recording in the delta file either:
    i) only changes to the contents of said markup language file such that element instances not changed in the markup language file are not recorded in the delta file, or
    ii) all the data of the markup language file and the changes to the markup language file,
    in each case the changes recorded in the delta file being validated against a document type definition (DTD) or XML Schema which is substantially the same as the document type definition (DTD) or XML Schema of said markup language file.

4. Software tangibly embodied in a computer-readable storage medium for recording in a delta file changes to a markup language file having a document type definition (DTD) or XML Schema, the software consisting of a set of instructions for performing the following steps:
    creating the delta file;
    assigning to the delta file a document type definition (DTD) or XML Schema which defines element types corresponding to the element types of the document type definition (DTD) or XML Schema of the markup language file, the element types of the delta file having the same constraints on the type, number and order of the document type definition elements or the XML Schema element types as the constraints defined in the document type definition (DTD) or XML Schema of said markup language file; and
    recording in the delta file either
    i) only changes to the contents of said markup language file such that element instances not changed in the markup language file are not recorded in the delta file, or
    ii) all the data of the markup language file and the changes to the markup language file, in each case the changes recorded in the delta file being validated against a document type definition (DTD) or XML Schema which is substantially the same as the document type definition (DTD) or XML Schema of said markup language file.

5. Software as claimed in claim 4, wherein each change recorded in the delta file is recorded at the lowest element level.

6. Software as claimed in claim 4, wherein the set of instructions includes instructions for additionally recording at least one of the markup language file and the changed markup language file.

7. Software tangibly embodied in a computer-readable storage medium for generating a delta file containing data representative of one or more changes to a markup language file having a document type definition (DTD) or XML Schema, the software consisting of a set of instructions for performing the following steps:

creating said delta file assigning to the delta file a document type definition (DTD) or XML Schema which defines element types comes corresponding to the element types of the document type definition (DTD) or XML Schema of the markup language file, the element types of the delta file having the same constraints on the type, number and order of the document type definition elements or the XML Schema element types as the constraints defined in the document type definition (DTD) or XML Schema of said markup language file; and recording in said delta file either:

i) only changes to the contents of said markup language file such that element instances not changed in the markup language file are not recorded in the delta file, or ii) all the data of the markup language file and the changes to the markup language file, in each case the changes recorded in said delta file being validated against a document type definition (DTD) or XML Schema which is substantially the same as the document type definition (DTD) or XML Schema of said markup language file.

8. Computer-readable data storage medium on which is stored software for generating a delta file containing data representative of one or more changes to a markup language file having a document type definition (DTD) or XML Schema, the software consisting of a set of instructions for performing the following steps:

creating said the delta file;

assigning to the delta file a document type definition (DTD) or XML Schema which defines element types corresponding to the element types of the document type definition (DTD) or XML Schema of the markup language file, the element types of the delta file having the same constraints on the type, number and order of the document type definition elements or the XML Schema element types as the constraints defined in the document type definition (DTD) or XML Schema of said markup language file; and recording in said delta file either:

i) only changes to the contents of the markup language file such that element instances not changed in the markup language file are not recorded in the delta file, or ii) all the data of the markup language file and the changes to the markup language file, in each case the changes recorded in said delta file being validated against a document type definition (DTD) or XML Schema which is substantially the same as the document type definition (DTD) or XML Schema of said markup language file.

9. A method of amending a later version of a markup language file having a document type definition (DTD) or XML Schema to an earlier version of said markup language file, the method comprising the following steps:

reading a delta file containing change data defining changes made to the earlier version of said markup language file, said delta file having a document type definition (DTD) or XML Schema which defines element types corresponding to the element types of the document type definition (DTD) or XML Schema of the markup language file, the element types of the delta file having the same constraints on the type, number and order of the document type definition elements or the XML Schema element types as the constraints defined in the document type definition (DTD) or XML Schema of said markup language file, and the delta file containing either:

i) only changes to the contents of the markup language file such that element instances not changed in the markup language file are not recorded in the delta file, or ii) all the data of the earlier markup language file and the changes to the earlier markup language file, wherein the change data in said delta file is valid with respect to a document type definition (DTD) or XML Schema which is substantially the same as the document type definition (DTD) or XML Schema of the earlier version of said markup language file, and applying the changes recorded in said delta file to the later version of said markup language file.

10. A method of amending a second markup language file having a document type definition (DTD) or XML Schema, the method comprising the following steps:

reading a delta file containing change data defining changes made to a first markup language file, said delta file having a document type definition (DTD) or XML Schema which defines element types corresponding to the element types of the document type definition (DTD) or XML Schema of the first markup language file, the element types of the delta file having the same constraints on the type, number and order of the document type definition elements or the XML Schema element types as the constraints defined in the document type definition (DTD) or XML Schema of said first markup language file, and the delta file containing either:

i) only changes to the contents of the markup language file such that element instances not changed in the markup language file are not recorded in the delta file, or ii) all the data of the earlier markup language file and the changes to the earlier markup language file, wherein the change data is valid with respect to a document type definition (DTD) or XML Schema which is substantially the same as the document type definition (DTD) or XML Schema of said first markup language file and the change data are potential amendments with respect to the contents of the second markup language file; and applying the change data recorded in said delta file to said second markup language file.

11. A method of recordal of changes to a markup language file having a document type definition (DTD) or XML Schema, wherein the method comprises the following steps:
- creating a delta file;
- assigning to the delta file a document type definition (DTD) or XML Schema which defines element types corresponding to the element types of the document type definition (DTD) or XML Schema of the markup language file, the element types of the delta file having the same constraints on the type, number and order of the document type definition elements or the XML Schema element types as the constraints defined in the document type definition (DTD) or XML Schema of said markup language file; and
- selectively recording in the delta file either:
  - i) only changes to the contents of said markup language file such that element instances not changed in the markup language file are not recorded in the delta file, or
  - ii) all the data of the markup language file and the changes to the markup language file,
- in each case the changes recorded in the delta file being validated against a document type definition (DTD) or XML Schema which is substantially the same as the document type definition (DTD) or XML Schema of said markup language file.

12. A method of recordal of changes to a markup language file having a document type definition (DTD) or XML Schema, wherein the method comprises the following steps:
- creating a delta file;
- assigning to the delta file a document type definition (DTD) or XML Schema which defines element types corresponding to the element types of the document type definition (DTD) or XML Schema of the markup language file, the element types of the delta file having the same constraints on the type, number and order of the document type definition elements or the XML Schema element types as the constraints defined in the document type definition (DTD) or XML Schema of said markup language file; and
- recording in the delta file changes to the contents of said markup language file including the type, sequence, nesting, attribute values and content of each element instance and element instances and attributes not changed in the markup language file are either recorded or not recorded in the delta file in each case the changes recorded in the delta file being validated against a document type definition (DTD) or XML Schema which is substantially the same as the document type definition (DTD) or XML Schema of said markup language file.

* * * * *